United States Patent [19]
Sturman

[11] 3,744,814
[45] July 10, 1973

[54] SHOCK ABSORBING SEATBELT ACTUATOR

[76] Inventor: Oded E. Sturman, 18643 Kirkolm Lane, Northridge, Calif.

[22] Filed: Aug. 18, 1971

[21] Appl. No.: 172,721

[52] U.S. Cl. ............................ 280/150 SB, 188/1 C
[51] Int. Cl. ............................................. B60r 21/10
[58] Field of Search ................. 280/150 SB, 150 B; 188/1 C; 296/65 A

[56] References Cited
UNITED STATES PATENTS

| | | | |
|---|---|---|---|
| 2,622,664 | 12/1952 | Koehler | 280/150 SB |
| 3,466,024 | 9/1969 | Spieth | 267/162 |
| 2,724,463 | 11/1955 | Becker | 188/1 C |
| 3,026,972 | 3/1962 | Hendry | 188/1 C |
| 2,401,748 | 6/1946 | Dillon | 188/1 C |
| 2,411,279 | 11/1946 | Lehman | 188/1 C |

*Primary Examiner*—Benjamin Hersh
*Assistant Examiner*—Robert R. Song
*Attorney*—Leonard Golove, Marvin H. Kleinberg et al.

[57] ABSTRACT

The invention relates to a shock absorbing device for use in a safety belt system which substantially decreases the forces applied to a human body restrained by the safety belt in high impact situations. The invention comprises a plurality of Belleville springs which are used to absorb and dissipate the energy produced by a vehicle collision. The novel configuration disclosed increases the comfort of the confined individual and protects him from those injuries which have been encountered with the use of conventional safety belts.

4 Claims, 1 Drawing Figure

PATENTED JUL 10 1973 3,744,814
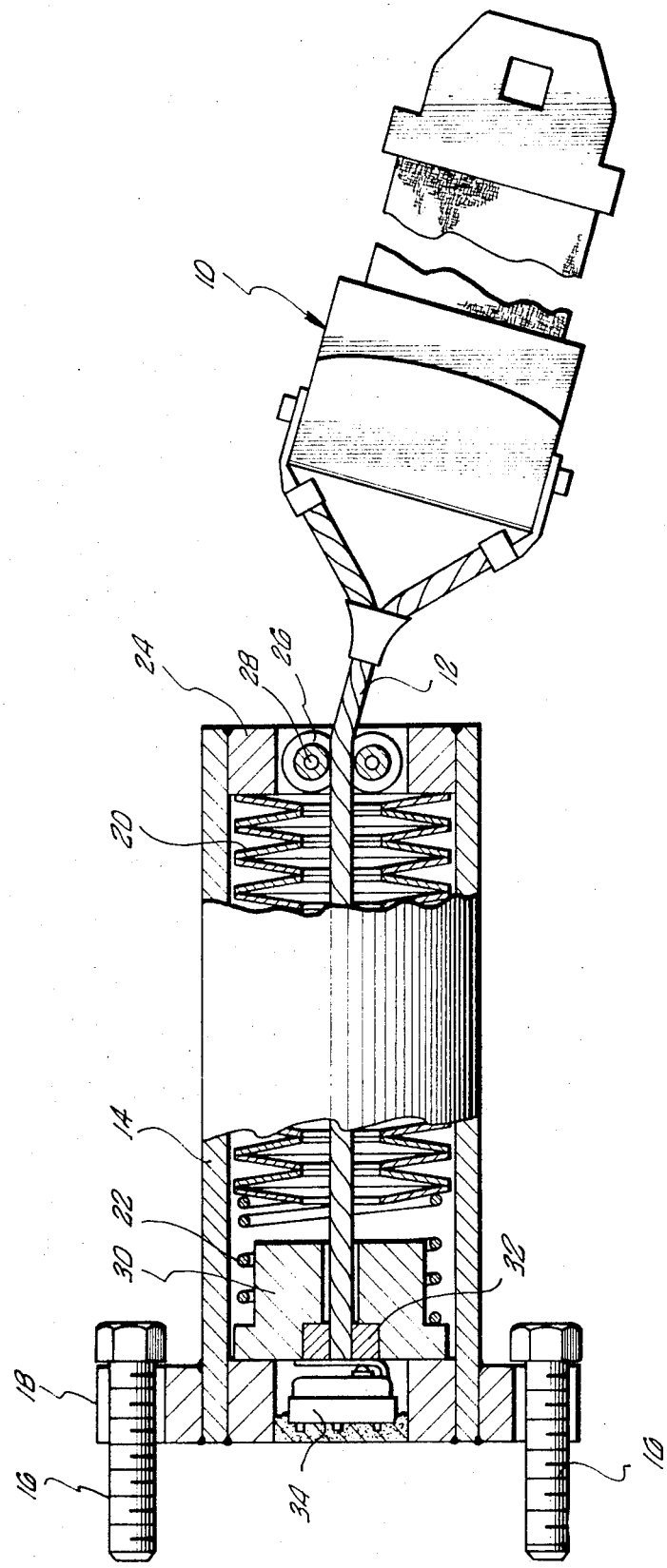

ical housing. The housing itself then tends to absorb en-
SHOCK ABSORBING SEATBELT ACTUATOR This invention relates to a safety belt having provisions for shock absorbing and more particularly to a shock absorbing device used in connection with a safety belt adapted to be used in an automobile or other moving vehicles.

It is well known and acknowledged that the use of a safety belt to restrain movement of a human body during a collision or other automobile accident substantially reduces the number of injuries suffered by occupants in the vehicle involved in an accident and minimizes the severity of the injuries suffered. In spite of this, many members of the public have been reluctant to have seatbelts installed in their automobiles or to use seatbelts when they are provided. In some of these instances, the public's reluctance can be explained by the fact that the tight fitting seatbelt is restraining and uncomfortable, combined with the fact that there are some situations in which the seatbelt itself causes injury. There have been many instances where a powerful impact will result in an extremely forceful contact between the individual and the seatbelt, resulting in external and internal injury to the wearer of the seatbelt.

The present invention provides apparatus which would tend to minimize or limit such injuries, which apparatus is relatively simple, inexpensive, reusable and effective.

In general, the shock absorber functions as an energy dissipating device for harmlessly absorbing the energy imparted to a human body when that body is subjected to rapid deceleration or high gravity load due to vehicle collisions or other incidents. Existing seatbelt systems are firm restraints which do not permit the restrained body to move in a controlled manner under extraordinary stress and which therefore subject the restrained individual to extremely large forces which can and do result in severe external and internal injury.

The energy absorber which is the subject of the present invention allows a body confined by a seatbelt or other safety appliance to move in a controlled manner over a measured distance, thereby increasing the deceleration time of the body and limiting the maximum "g" forces which would normally be applied to the confined body in a vehicle collision. The limitation of the "g" forces in this manner greatly reduces or eliminates the likelihood of severe injuries which can and do occur when safety systems are used which are rigidly anchored to the structure of an automobile or other vehicle.

The underlying reason for the advantage provided by the present invention can be understood from the following.

The force applied to a body is measured by the mass of the body times its acceleration (F=Ma, the well known Newtonian law). The acceleration of a body can be expressed as $$a = \Delta v / \Delta t$$

Thus increasing the deceleration time reduces the acceleration of the body proportionately, this, in turn, proportionately reduces the force on the body. Since the deceleration time for a rigidly confined body is extremely small (theoretically zero), relatively small increase in the deceleration time produce extremely large reductions in the force applied to the restrained body. For the reasons given above, the device which is the subject of the present invention is extremely effective in reducing or eliminating injuries.

Briefly described, the present invention is an assembly which is mechanically connected to the body of a vehicle. The assembly comprises a cylindrical tube which houses a plurality of substantially identical Belleville springs mounted face to face and back to back. A connecting wire cable or equivalent flexible load transmitting member is connected to a compression block assembly, adapted to compress the Belleville springs, which is connected to the seatbelt web. When subjected to the large forces encountered in a collision or the like, a sudden heavy load is applied to the seatbelt which transfers the applied force through the flexible cable to the compression block assembly, causing compression of the Belleville springs and growth in the outer diameter of the springs. When sufficient load is applied to the springs, continued growth in their diameter occurs until such time as the outer surface of the springs interferes with the inside surface of the cylindrical housing. The housing itself then tends to absorb energy until the forces applied to the spring slide along the surface against the relatively large frictional and other forces resisting this motion. All of these energies are thus dissipated in a harmless manner. It has been found that the system described above may be cycled any desired number of times with no degradation in performance. The system which will be described in detail below also contains a relatively low tension spring which permits some degree of movement by the confined individual before the relatively high resistance of the Belleville springs is encountered. The limited freedom thus afforded the individual tends to minimize the "confined feeling" which is annoying to many people.

An object of the present invention is to provide a novel energy absorbing device for use with a safety belt system which tends to reduce the force applied by the safety belt system to the individual by a collision or the like.

Another object of the present invention is to provide a novel energy absorbing device for use with a safety belt system, providing a limited degree of freedom to the confined individual, while controlling the movement of the individual under the forces generated by high impact.

Still another object of the present invention is to provide a novel energy absorbing system, for use in a safety belt system, which permits controlled movement of the confined body.

A further object of the present invention is to provide a novel energy absorbing system, for use in a safety belt system, which is relatively inexpensive to manufacture and which has extremely high reliability.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is a partially cut-away plan view of the energy absorbing system of the present invention, together with a portion of the safety belt system.

Turning now to FIG. 1, there is shown the energy absorbing system which is the subject of the present invention, together with a portion of a safety belt system. One side of the safety belt web 10 is shown including a strap and a clasp member which are attached to a flexible steel cable 12 which provides coupling to the frame of the vehicle into which the system has been installed. A cylindrical housing 14 is mounted in the vehicle body, probably fastened to the floor of the vehicle to the cylindrical housing 14 through a cylindrical member 18 which is rigidly coupled to the cylindrical housing 14.

The cylindrical housing 14 houses a plurality of Belleville springs 20, mounted face to face and back to back, as shown in FIG. 1. Immediately adjacent the Belleville springs 20 is a helical spring 22. The steel cable 12 is introduced into the cylindrical housing 14 through a fixed ring 24 into which is mounted a pair of guide rollers 26 which are pinned to the ring 24 by pins 28, such that the guide rollers 26 are free to rotate. The steel cable 12 is held at the axis of the cylindrical housing 14 by the guide rollers 26 and is threaded through the Belleville springs 20 and the helical spring 22, to a compression block 30. The steel cable 12 is attached to the compression block 30 by a jam nut 32. The compression block 30 is positioned so that it can make contact with the helical spring 22 and the Belleville springs 20, such that force on the steel cable 12 will tend to compress the helical spring 22 and the Belleville springs 20.

As has been stated, compression of the helical spring 22, which is a relatively low tension spring, permits the body confined by the safety belt system a degree of freedom for those body movements which are normal to an individual. However, when the compression block assembly 30 contacts the Belleville springs 20, substantial resistance to movement is encountered. In the case of an impact forcing the confined body into the safety belt assembly with a high degree of force, the Belleville washers 20 will first tend to compress, absorbing some of the energy of impact, and will at the same time expand, making contact with the cylindrical housing 14. Still more energy is dissipated by frictional forces between the Belleville springs themselves, between the expanded edges of the Belleville springs 20 and the surface of the cylindrical housing 14, and by other frictional, compressional and rotational forces and torques. Ultimately, if enough force is applied, the edges of the Belleville springs 20 will remove a thin layer of metal from the cylindrical housing 14. The removal of metal, however, absorbs a great deal of energy; often more than is encountered in a collision. The dissipation of energy can be controlled by an appropriate choice of dimension factors such as the dimensions of the Belleville springs and the dimensions of the cylindrical housing 14.

The energy absorbing unit which is the subject of the present invention may be provided with a safety switch in electrical series connection with the starter mechanism of the vehicle, so that the vehicle can not be started unless the safety belt system is fastened in position. The switch 34 would be placed within the cylindrical member 18 such that pressure applied on the switch 34 by the compression block 30 would prevent operation of the vehicle. When the safety belt is fastened, however, a relatively small amount of tension on the cable 12 against the resistance of the low tension spring 22 would allow operation of the switch 34 and permit the vehicle to start. Since the switch would not affect normal operation of the vehicle, movement of the occupant after the vehicle engine has started would not affect the operation of vehicle.

There has thus been described an embodiment of the present invention. Other embodiments of the present invention, and modifications of the embodiments presented herein, may be developed without departing from the essential characteristics of the present invention. Accordingly, the invention should be limited only by the scope of the claims appended below.

What is claimed as new is:

1. In combination with a safety belt adapted to be used in a moving vehicle to restrain the movement of a body under the relatively high energy impact loads associated with vehicle collisions, the device comprising:

a support member adapted to be mounted on the vehicle having a bore of cross-sectional dimension $d_1$ extending therethrough;

a plurality of Belleville spring washers having a maximum uncompressed dimension $d_2$, less than $d_1$, adapted to be compressed and thereupon to expand, stacked axially within said bore, said dimensions $d_1$ and $d_2$ being such that, upon compression of said Belleville spring washers, the dimension $d_2$ expands, approaching and exceeding dimension $d_1$;

a compression element positioned axially within said bore, for compressing and expanding said washers; and a flexible connecting member connected to the safety belt and to said compression element for transmitting loads applied to the safety belt to compress and expand said washers.

2. Apparatus according to claim 1 in which said bore has a circular cross-section, said cross-sectional dimension is a diameter $d_1$ and in which said Belleville spring washers are circular, and said maximum dimension is a diameter $d_2$.

3. In combination with a safety belt adapted to be used in a moving vehicle to restrain the movement of a body under the relatively high energy impact loads associated with vehicle collisions, the device comprising:

a support member adapted to be mounted on the vehicle having a bore extending therethrough;

energy absorbing means positioned axially with said bore including a plurality of Belleville spring washers for frictional interference with said bore;

a relatively low tension spring positioned axially within said bore adjacent said energy absorbing means;

a compression element, positioned axially within said bore, for compressing said energy absorbing means and said low tension spring; and a flexible connecting member connected to the safety belt and to said compression element for transmitting loads applied to the safety belt to said low tension spring and to said energy absorbing means;

whereby relatively small loads compress said low tension spring and relatively large loads compress both said low tension spring and said energy absorbing means.

4. In combination with a safety belt adapted to be used in a moving vehicle to restrain the movement of a body under the relatively high energy impact loads associated with vehicle collisions, the device comprising:

a support member adapted to be mounted on the vehicle having a bore extending therethrough;

said bore having a circular cross-section of diameter $d_1$;

relatively high tension spring means comprising a plurality of Belleville spring washers positioned axially with said bore;

said Belleville spring washers being circular having an uncompressed diameter $d_2$ less than diameter $d_1$, said diameters $d_1$ and $d_2$ being such that, upon compression of said Belleville spring washers, the diameter $d_2$ expands, approaching and exceeding the diameter $d_1$;

a relatively low tension spring positioned axially within said bore adjacent said high tension spring means;

a compression element, positioned axially within said bore, for compressing said Belleville spring washers and said low tension spring; and a flexible connecting member connected to the safety belt and to said compression element for transmitting loads applied to the safety belt to said low tension spring and to said high tension spring means;

whereby relatively small impact loads compress said low tension spring and relatively large loads compress both said low tension spring and said high tension spring means, expanding said Belleville spring washers to a diameter greater than that of said bore.

* * * * *